(12) United States Patent
Lakkundi et al.

(10) Patent No.: US 12,204,418 B2
(45) Date of Patent: Jan. 21, 2025

(54) ANALYZING A BLOCKCHAIN LEDGER TO DETERMINE WHICH DISASTER RECOVERY SITE TO USE FOR FAILOVER

(71) Applicant: Kyndryl, Inc., New York, NY (US)

(72) Inventors: Abdul Kareem A. Lakkundi, Gadag (IN); Rajesh Ganji, Bengaluru (IN); Abdul Karimulla Shakhadari Mohammed, Kovvur (IN); Ashutosh Janoria, Bangalore (IN)

(73) Assignee: Kyndryl, Inc., New York, NY (US)

(*) Notice: Subject to any disclaimer, the term of this patent is extended or adjusted under 35 U.S.C. 154(b) by 90 days.

(21) Appl. No.: 17/985,312

(22) Filed: Nov. 11, 2022

(65) Prior Publication Data
US 2024/0160533 A1    May 16, 2024

(51) Int. Cl.
| | |
|---|---|
| G06F 11/00 | (2006.01) |
| G06F 11/14 | (2006.01) |
| G06F 11/20 | (2006.01) |
| H04L 9/40 | (2022.01) |

(52) U.S. Cl.
CPC ...... *G06F 11/1469* (2013.01); *G06F 11/1464* (2013.01); *G06F 11/2023* (2013.01); *H04L 63/1416* (2013.01)

(58) Field of Classification Search
CPC ............. G06F 11/2023; G06F 11/1469; G06F 11/1464
See application file for complete search history.

(56) References Cited

U.S. PATENT DOCUMENTS

| | | | |
|---|---|---|---|
| 9,424,152 B1* | 8/2016 | Raut | G06F 11/2041 |
| 11,297,090 B2* | 4/2022 | dos Santos Silva | G06N 3/08 |
| 2019/0188089 A1* | 6/2019 | Mueller | G06F 16/11 |
| 2020/0387433 A1* | 12/2020 | Wang | G06F 16/2365 |

(Continued)

FOREIGN PATENT DOCUMENTS

| | | |
|---|---|---|
| CN | 108810127 B | 6/2021 |
| CN | 113778750 A | 12/2021 |
| WO | 2022013851 A1 | 1/2022 |

OTHER PUBLICATIONS

Anonymous, "Cognitive Disaster Recovery System," IP.com Prior Art Database, Technical Disclosure No. PCOM000265633D, May 2, 2021, 3 pages.

(Continued)

*Primary Examiner* — Marc Duncan
(74) *Attorney, Agent, or Firm* — CANTOR COLBURN LLP; Dan Housley

(57) ABSTRACT

A computer-implemented method according to one embodiment includes accessing a copy of a ledger that includes information associated with a plurality of potential recovery sites of a multi-site environment. The information of the copy of the ledger is stored on a blockchain by the potential recovery sites. A current threat to a production site of the multi-site environment is identified. The method further includes, analyzing, based on the current threat, the copy of the ledger to determine one of the potential recovery sites to use as a failover for the production site, and in response to a determination that the current threat has caused a disaster event on the production site, causing the production site to failover to the determined recovery site.

20 Claims, 9 Drawing Sheets

(56) References Cited

U.S. PATENT DOCUMENTS

2021/0034992 A1* 2/2021 Mukeri ................ G06F 11/302
2021/0306205 A1* 9/2021 MacCarthaigh .... G06F 11/2025

OTHER PUBLICATIONS

Anonymous, "Method to Retrieve Local Site Storage Subsystem State and Error Information During Disaster Recovery of the Subsystem at a Remote Site," IP.com Prior Art Database, Technical Disclosure No. PCOM000170158D, May 9, 2008, 4 pages.

Anonymous, "A Method for quick bring up of the virtual machine on a recovery site in cloud environments," IP.com Prior Art Database, Technical Disclosure No. IPCOM000249217D, Feb. 10, 2017, 4 pages.

Anonymous, "DR Site Management Tool," IP.com Prior Art Database, Technical Disclosure No. PCOM000135491D, Apr. 18, 2006, 4 pages.

Anonymous, "Method to create user friendly Site Recovery Adapter with real time storage configuration details," IP.com Prior Art Database, Technical Disclosure No. IPCOM000231006D, Sep. 22, 2013, 6 pages.

* cited by examiner

| Set of Attributes/Parameters | App AKRA @1st city | | AKRA Readiness @2nd city | | AKRA Readiness @3rd city | | AKRA Readiness @4th city | | AKRA Readiness @5th city | | Priority 1 to 10 |
|---|---|---|---|---|---|---|---|---|---|---|---|
| | Score | Unit | Score | Unit | Score | Unit | Score | Unit | Score | Unit | |
| Recovery Point Objective | 00:00 | Hours | 00:00 | Hours | 00:15 | Hours | 00:10 | Hours | 06:00 | Hours | 1 |
| Recovery Time Objective | 00:00 | Hours | 00:10 | Hours | 00:25 | Hours | 00:32 | Hours | 01:30 | Hours | 2 |
| No IT Outage since | 345 | days | 230 | days | 453 | days | 156 | days | 277 | days | 5 |
| Load balancer Capabilities | 100 | % | 0 | % | 60 | % | 100 | % | 30 | % | 7 |
| No Power Outage Since | 300 | days | 286 | days | 540 | days | 180 | days | 60 | days | 8 |
| Infrastructure capabilities | 60 | % | 30 | % | 80 | % | 50 | % | 30 | % | 4 |
| Housekeeping capabilities | 91 | % | 58 | % | 90 | % | 69 | % | 72 | % | 10 |
| People competency – (Skills) | 60 | % | 40 | % | 50 | % | 60 | % | 40 | % | 4 |
| Experience in maintaining/managing DR | 70 | % | 51 | % | 80 | % | 48 | % | 65 | % | 6 |
| Interdependency on other sites | 30 | % | 50 | % | 40 | % | 50 | % | 50 | % | 8 |
| Geographic's Advantage | 80 | % | 20 | % | 70 | % | 40 | % | 25 | % | 7 |
| Time zone Advantage | 30 | % | 50 | % | 30 | % | 70 | % | 52 | % | 10 |
| Cost (of moving production to DR/CR) | 40 | % | 78 | % | 45 | % | 60 | % | 70 | % | 3 |
| Recovery Type | PR | NA | DR | NA | DR | NA | DR | NA | CR | NA | 2 |
| Regulatory Compliance | 100 | % | 92 | % | 98.7 | % | 0 | % | 100 | % | 1 |
| Insider threat | 22 | % | 55 | % | 100 | % | 40 | % | 0 | % | 2 |

FIG. 5

ANALYZING A BLOCKCHAIN LEDGER TO DETERMINE WHICH DISASTER RECOVERY SITE TO USE FOR FAILOVER

BACKGROUND

The present invention relates to disaster recovery, and more specifically, this invention relates to analyzing a blockchain ledger to determine which disaster recovery site of a plurality of potential disaster recovery sites to use for failover of an application in the event that a production site fails.

In network environments, an application running on a first site, e.g., a production site, may rely on one or more other sites to failover to in the event that the first site experiences a disaster event. Accordingly, such sites may serve as disaster recovery (DR) sites for the production site. For context, the disaster events that may occur and cause the first site to at least temporarily fail may include disasters, e.g., natural disasters, human caused disasters, etc., and/or threats, e.g., cyber threats and the like. In a world where different kinds of threats to vital infrastructure technology and systems are a reality, and where disasters are also expected to occur at some point, it is prudent that network environments include a plan of action in the event that a disaster event at one or more sites of the network environment does occur.

SUMMARY

A computer-implemented method according to one embodiment includes accessing a copy of a ledger that includes information associated with a plurality of potential recovery sites of a multi-site environment. The information of the copy of the ledger is stored on a blockchain by the potential recovery sites. A current threat to a production site of the multi-site environment is identified. The method further includes, analyzing, based on the current threat, the copy of the ledger to determine one of the potential recovery sites to use as a failover for the production site, and in response to a determination that the current threat has caused a disaster event on the production site, causing the production site to failover to the determined recovery site.

A computer program product according to another embodiment includes a computer readable storage medium having program instructions embodied therewith. The program instructions are executable by a computer to cause the computer to perform the foregoing method.

A system according to another embodiment includes a hardware processor, and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 5 depicts a table, in accordance with one embodiment of the present invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for analyzing a copy of a blockchain ledger to determine which disaster recovery site of a plurality of potential disaster recovery sites to use for failover of an application in the event that a production site fails.

In one general embodiment, a computer-implemented method includes accessing a copy of a ledger that includes information associated with a plurality of potential recovery sites of a multi-site environment. The information of the copy of the ledger is stored on a blockchain by the potential recovery sites. A current threat to a production site of the multi-site environment is identified. The method further includes, analyzing, based on the current threat, the copy of the ledger to determine one of the potential recovery sites to use as a failover for the production site, and in response to a determination that the current threat has caused a disaster event on the production site, causing the production site to failover to the determined recovery site.

In another general embodiment, a computer program product includes a computer readable storage medium having program instructions embodied therewith. The program instructions are executable by a computer to cause the computer to perform the foregoing method.

In another general embodiment, a system includes a hardware processor, and logic integrated with the processor, executable by the processor, or integrated with and executable by the processor. The logic is configured to perform the foregoing method.

Figure 1:
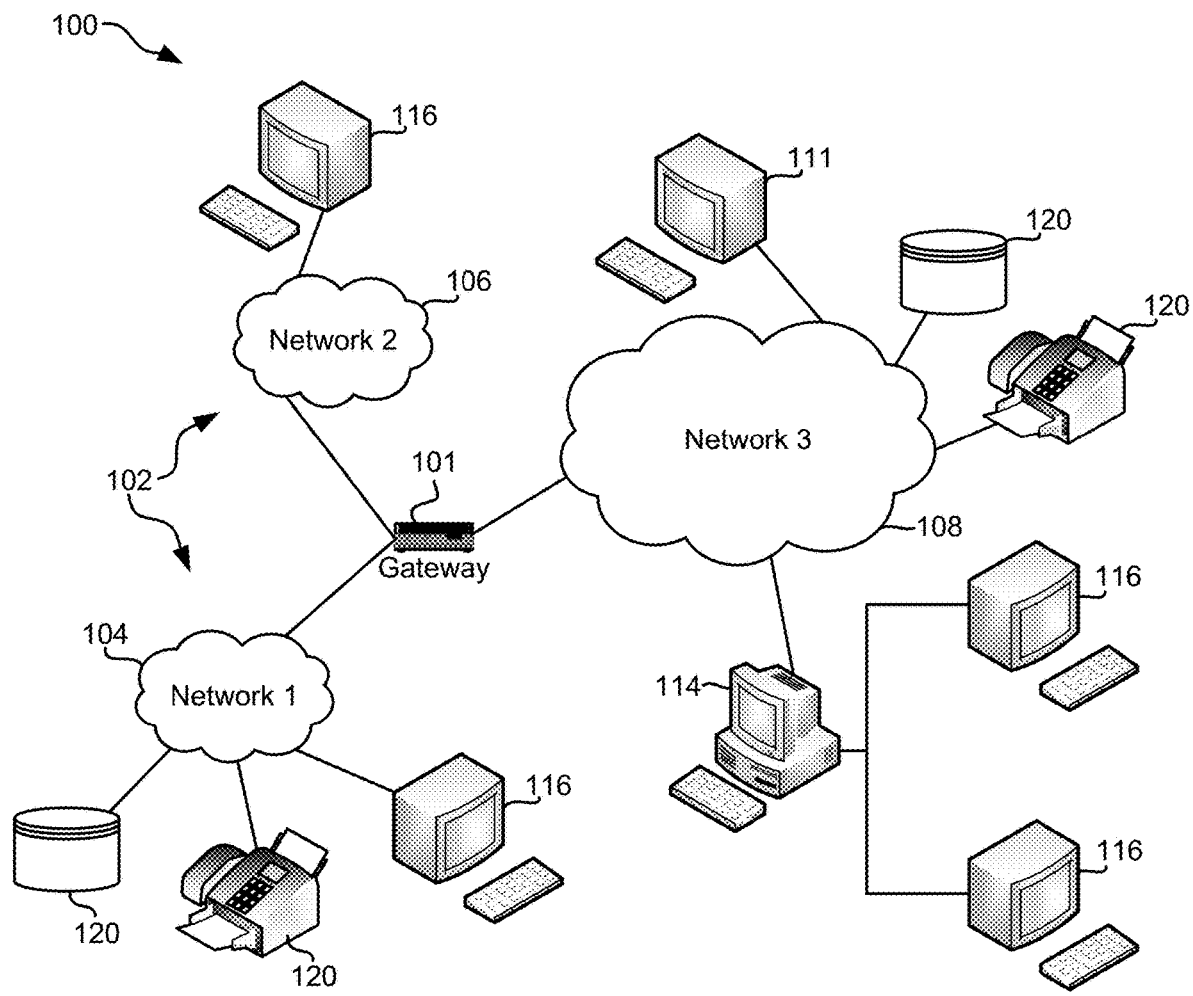
FIG. 1 is a diagram of a network architecture, in accordance with one embodiment of the present invention.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment (IBM and all IBM—based trademarks and logos are trademarks or registered trademarks of International Business Machines Corporation and/or its affiliates), a UNIX® system which virtually hosts a known operating system environment, an operating system which emulates an IBM® z/OS® environment, etc. This virtualization and/or emulation may be enhanced through the use of VMware® software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
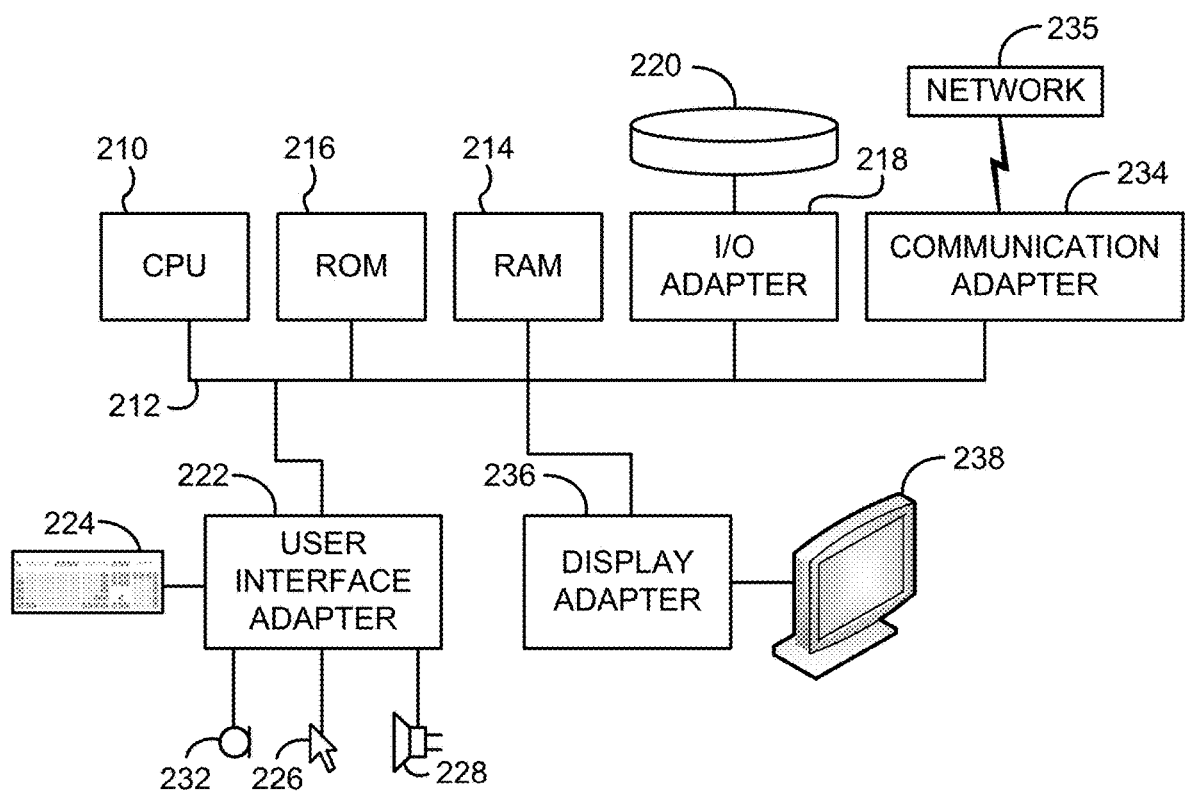
FIG. 2 is a diagram of a representative hardware environment that may be associated with the servers and/or clients of FIG. 1, in accordance with one embodiment of the present invention.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

As mentioned elsewhere herein, in network environments, an application running on a first site, e.g., a production site, may rely on one or more other sites to failover to in the event that the first site experiences a disaster event. Accordingly, such sites may serve as disaster recovery (DR) sites for the production site. For context, the disaster events that may occur and cause the first site to at least temporarily fail may include disasters, e.g., natural disasters, human caused disasters, etc., and/or threats, e.g., cyber threats and the like. In a world where different kinds of threats to vital infrastructure technology and systems are a reality, and where disasters are also expected to occur at some point, it is prudent that network environments include a plan of action in the event that a disaster event at one or more sites of the network environment does occur.

With various types of disasters and threats existent in a typical network environment, a common course of action results in a second site, which is equally competent as the first site that experiences a disaster event, being used to recover applications running on a first site. In some ideal cases there is more than one disaster recovery site for an application to failover to. However, the availability of having more than one disaster recovery site may depend on several factors, e.g., type of disaster event that is experienced, capabilities that the failover site is expected to have, etc. For example, such factors may be based on, e.g., viz. infrastructure strength, skill, time zones, etc.

A type of disaster event and a time that it occurs makes recovery complex in that there are numerous aspects that come into play. Furthermore, because all these aspects are dynamic in nature, there is a need for techniques that are also equally dynamic in deciding which site to use for recovering an application when a disaster event strikes. For example, assume that there are five IT infrastructure sites, e.g., A, B, C, D and E. The site A may act as a production site for some applications, and sites B, C, D, and E may act as potential disaster recovery sites. It may be assumed that the application "AKRA" is hosted on site A, and sites B, C, D and E all act as disaster recovery sites for this application. Each of these disaster recovery sites differ in certain aspects when it comes to serving as a disaster recovery site for the application.

These factors complicate the process of recovering from a disaster event by adding complexity to the process of identifying a relatively best, e.g., most applicable, disaster recovery site to failover to at a given point in time that a disaster occurs. The process of identifying such disaster recovery site to failover to at a given point in time that a disaster occurs is often performed manually by one or more administrators of the network environment that includes the sites. However, because of the complexity associated with considering the factors mentioned above, disaster recovery is typically a relatively time consuming and resource intensive process. Furthermore, because factors and availabilities of potential recovery sites are constantly changing, a majority of the analysis that is performed using conventional techniques for selecting a failover site for a production site is typically postponed until the disaster event occurs. As a result, the recovery process and the failover process are delayed, which is undesirable to customers of these sites in the network environment.

In sharp contrast to the deficiencies of the conventional recovery techniques described above, the various embodiments and approaches described herein include the capability to intelligently identify a preferred recovery site, e.g., a rightful cyber resiliency site, to failover to, based on the type of threat that is currently posed in a multi-site network environment. More specifically, the multi-site network environment may include a plurality of potential failover sites for each application. Each site includes unique aspects for protecting the application which include relative strengths and a capability to failover for a specific kind of threat. The sites are networked using the blockchain framework. These techniques furthermore include an artificial intelligence (AI) driven solution. More specifically, an AI engine is used that is configured detect a threat, identify the type of threat, while remaining cognizant of which sites are available to failover to. The engine furthermore accurately suggests what site an application of a production site should failover to in the event that a disaster event occurs. These techniques also offer a blockchain assisted solution. More specifically, the AI is driven by the blockchain and assists the blockchain with blockchain data which is poled periodically from every site per application. The moment that a disaster events occurs on a site or an application, the absence of a response will indicate to the blockchain that the affected application needs to be recovered on a recovery site. The AI is then used to determine the specific recovery site to failover to.

Figure 3:
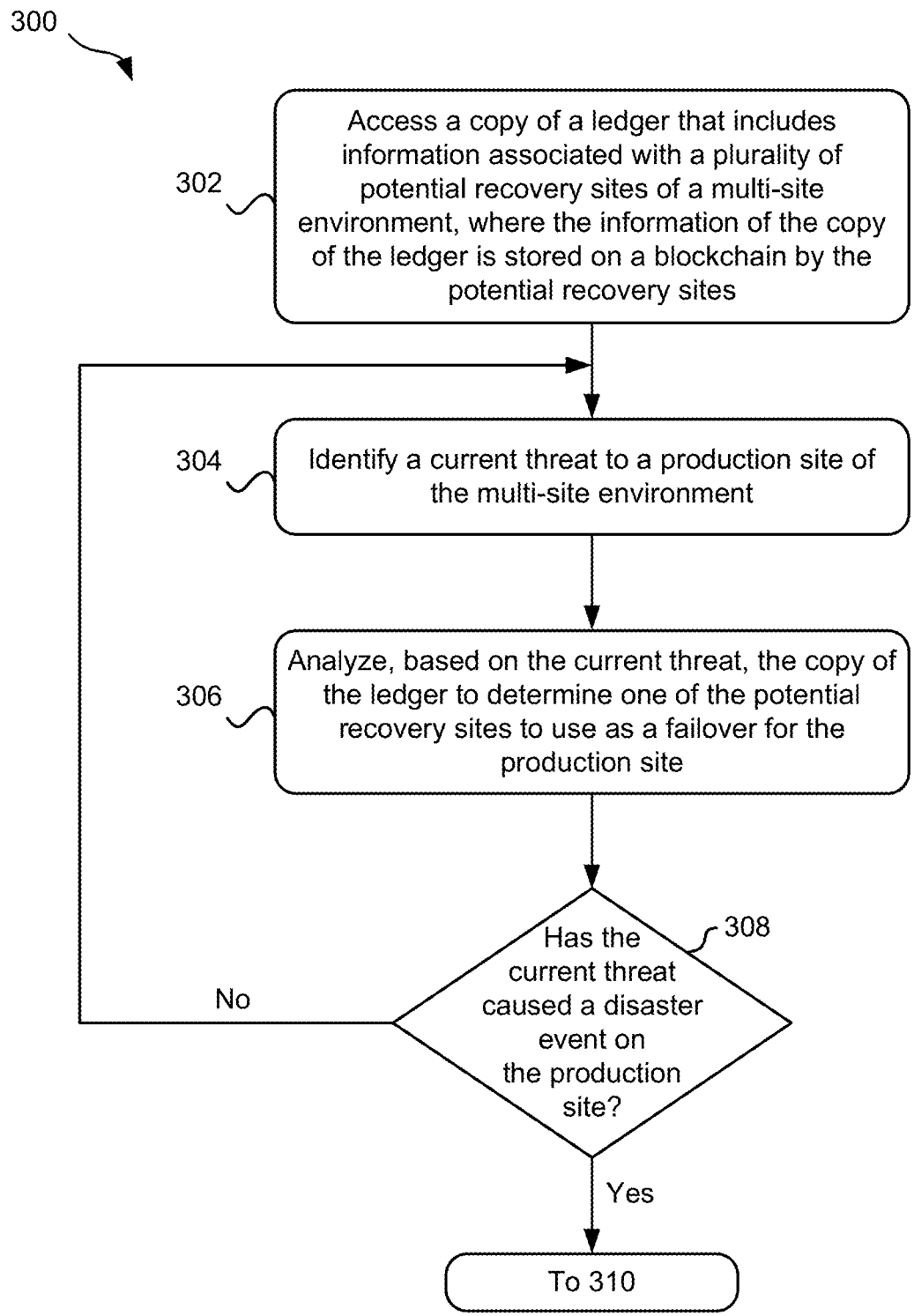
FIG. 3 is a flowchart of a method, in accordance with one embodiment of the present invention.
Figure 3:
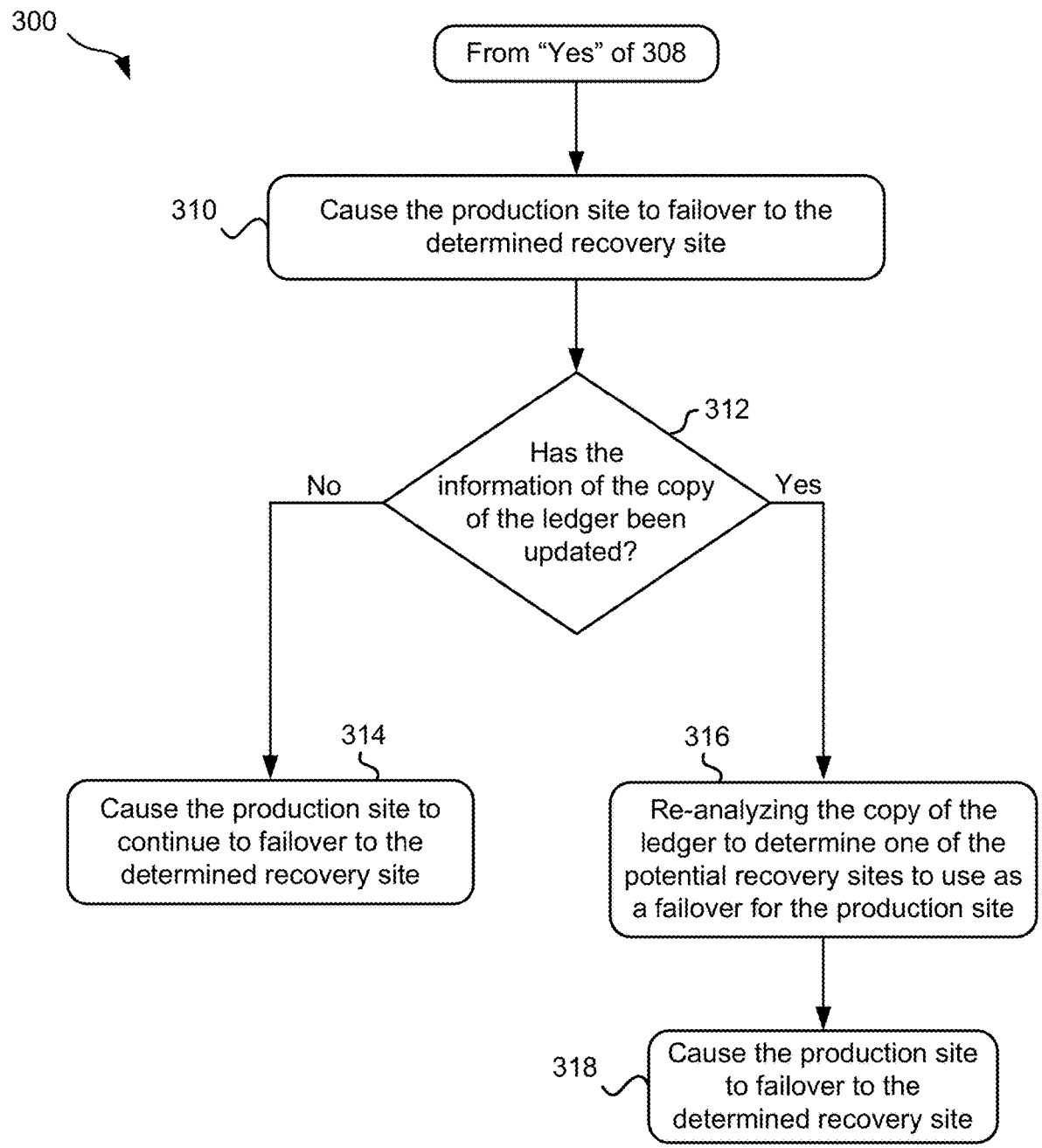

Now referring to FIG. 3, a flowchart of a method 300 is shown according to one embodiment. The method 300 may be performed in accordance with the present invention in any of the environments depicted in FIGS. 1-8, among others, in various embodiments. Of course, more or fewer operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that method 300 is in some preferred approaches performed in a multi-site network environment. Each of such sites may include, e.g., a server, a computer, a processing circuit, etc. Furthermore, in some approaches, a common application may be run by a plurality of the sites. In some other approaches, different applications may be run at the different sites. The network environment may include at least one production site, and preferably a plurality of other sites that are potential failover sites for the production site. For context, any of the sites of the network environment may be considered the "production site." This way, various operations of method 300 may be performed in parallel in which each of the sites is considered a "production site" while a remainder of the other sites are potential failover sites for the production site. This way, in the event that any of the sites experience a failure event, as a result of performing the techniques described herein, a failover site for the site that experiences the disaster event is determined. More specifically, from an application perspective, assuming that the site that experiences the failure event is running a first type of application, the determined failover site is preferably able to run the first type of application for the site that experiences the failure event, e.g., until recovery from the failure event is achieved on the site that experiences the failure event.

Each of the sites of the multi-site environment are preferably configured to report, e.g., upload, ongoingly update, respond to a query, output, etc., information to a predetermined blockchain which may be of a known type. For context, in some preferred approaches, the information is preferably associated with the site that is reporting such information. Accordingly, the information may include parameters of the site. In some approaches, the parameters may be dynamically selected. Various examples of such parameters include, e.g., recovery time, time zones, recovery type, viz. infrastructure strength associated with capabilities of the potential recovery site, a time since last experiencing a power outage, a time since last experiencing an IT outage, cost of transitioning from using a production site to the potential disaster recovery and/or cyber recovery site associated with the information, a recovery point objective, load balancer capabilities, housekeeping capabilities, people competency (skills), prior experience in maintaining and/or managing disaster recovery, interdependency on other sites, geographical advantages such as the same or similar time zone or common language, regulatory compliance, an insider threat score, etc. In some approaches, method 300 includes causing, e.g., instructing, querying, requesting, etc., the sites of the multi-site environment to report such information to the blockchain.

For context, the reported information may provide a perspective of how readily available and how successful the reporting potential recovery site would be in the event that the reporting potential recovery site is selected as a failover site for another site that experiences a failure event. In some approaches, this information may be reviewable, e.g., by a processing device such as a computer performing operations of method 300, in a ledger of the blockchain. Accordingly, method 300 includes accessing a copy of a ledger that includes the information, e.g., parameters, associated with a plurality of potential recovery sites of the multi-site environment, e.g., see operation 302. For context, the "copy" of the ledger may in some approaches be an original, e.g., working copy, ledger file itself, while in some other approaches, the copy of the ledger may in fact be a copy of the original ledger. As indicated elsewhere above, the information of the copy of the ledger is preferably ongoingly stored on the blockchain by the potential recovery sites, e.g., in response to being instructed to store such information, in response to a predetermined amount of time elapsing, in response to a predetermined event such as a disaster event on one of the sites occurring, etc.

In order to determine which of the potential recovery sites is relatively most suited to be assigned as a failover site for a production site, in some approaches, a threat that the production site is subjected to may be considered. In some approaches, method 300 includes identifying a current threat to the production site of the multi-site environment, e.g., see operation 304. In some approaches, the current threat may be potentially capable of directly affecting the production site. In some other approaches, the current threat may be potentially capable of directly affecting a potential recovery site that the production site is in communication with and/or relies on being functional in order for the production site to be functional. The current threat may, in one approach, include a natural disaster event, e.g., a tornado, a typhoon, a tsunami, a heat wave, a hurricane, etc. In another approach, the current threat may additionally and/or alternatively include a human-made disaster event, e.g., a power grid meltdown, a plant operator error, a vehicle accident that disrupts the functioning of the production site, etc. The current threat may additionally and/or alternatively include a cyber-attack, e.g., malware, a computer virus, a phishing attack, unauthorized access of a login credential used at the production site, unauthorized access to electronic information of the production site, etc. In yet another approach, the current threat may additionally and/or alternatively include an insider threat, e.g., such as a human gaining unauthorized physical and/or electronic access to the production site.

Identifying the current threat to the production site may, in some approaches, include gathering reports and auditing the reports to determine whether the reports indicate a predetermined type of event, e.g., a weather report for a geographical location of the production site that includes temperatures outside of a predetermined range of temperatures, a report for a geographical location of the production site that includes a predetermined dangerous weather event, reports of a cyber-attack within a geographical location of the production site, reports of a cyber-attack on a program and/or application, e.g., AKRA, used by the production site, etc. The current threat may additionally and/or alternatively be identified from a warning notification received from the production site and/or a monitoring service that is configured to monitor for current threats to the production site. In some other approaches, identifying the current threat to the production site may additionally and/or alternatively include detecting a predetermined threat event using techniques that would become apparent to one of ordinary skill in the art upon reading the descriptions herein.

Operation 306 includes analyzing, based on the current threat, the copy of the ledger to determine one of the potential recovery sites to use as a failover for the production site. Various illustrative techniques for analyzing the copy of the ledger are described below, any one or more of which may be used to perform operation 306.

In one approach, analyzing, based on the current threat, the copy of the ledger to determine one of the potential recovery sites to use as the failover for the production site includes comparing one or more parameter scores of each of the potential recovery sites. In some approaches, parameter information may be scored by the potential recovery sites prior to being uploaded to the blockchain, e.g., scored according to predetermined scoring instructions. In some other approaches, an optional operation of method 300 includes accessing the information from the copy of the ledger, and scoring, using a predetermined scoring scheme, the information to establish scored parameter information. The analyzing may additionally and/or alternatively include identifying a first of the potential recovery sites having relatively greater parameter scores than the parameter scores of the other potential recovery sites. The first potential recovery site is preferably determined to be the site to use as a failover for the production site. For example, the copy of the ledger may be analyzed to determine a first of the potential recovery sites that includes a relatively higher infrastructure capability score than a remainder of the potential recovery sites. In such an example, the determined recovery site is the first potential recovery site. It should be noted that for some parameters, a relatively lowest parameter score may be preferable. For example, assuming that the parameter used for the determination of the potential recovery site to use as a failover is a score that is based on a number of insider threats that are present, a relatively lowest parameter score may be preferred in some approaches. It should also be noted that in some approaches, method 300 may optionally include determining, for each potential recovery site, a mathematical value, e.g., average, mean, median, mode, etc., to use in the comparison of the parameter scores.

In some other approaches, analyzing, based on the current threat, the copy of the ledger to determine one of the potential recovery sites to use as the failover for the production site may additionally and/or alternatively include comparing one or more parameters of each of the potential recovery sites to one or more current parameters of the production site. This analysis may, in some approaches, include comparing parameter scores of the production site with at least some parameter scores of one or more of the potential recovery sites. The determined recovery site may, in some approaches, be the potential recovery site determined to have parameters with a relative greatest degree of similarity with the current parameters of the production site.

At least some parameter types that are considered in the analysis of the copy of the ledger may be predetermined to be relatively more applicable to the current threat to the production site than some other parameters. For example, assuming that a current threat to the production site is based on a natural disaster that is expected to cause a disaster event and failure of the production site for an extended period of time. In such an example, potential recovery sites having a relatively large amount of experience in maintaining and/or managing disaster recovery may be predetermined to be relatively most applicable to the current threat to the production site. This is because it may be predetermined that experience in maintaining and/or managing disaster recovery may correlate with an ability to serve as a failover for an extended period of time. In another example, assuming that a current threat to the production site and/or one or more of the potential recovery sites is based on a power grid failure in a geographical location of the production site, potential recovery sites that have not experienced a power outage in a relatively long amount of time may be predetermined to be relatively most applicable to the current threat to the production site. This is because, in the event that the production site experiences a power outage disaster event, having a failover recovery site also experience a power outage as well would multiply the amount of interruption that customers of the failed sites experience. A first of the potential recovery sites having parameters that are relatively more resistant to the identified current threat than the other potential recovery sites may be determined, and the determined recovery site may be at least temporarily set to be the first potential recovery site.

It may be noted that the multi-site environment may be fluid in that, e.g., current threats to the sites may change at any point in time, availability of at least some of the potential recovery sites may change at any point in time, parameters of at least some of the potential recovery sites may change at any point in time, etc. For this reason, in order to determine a best, e.g., most applicable, one of the potential recovery sites to use as a failover for the production site, the analysis may consider a relatively most current set of the information, e.g., parameters, of the potential recovery sites in the copy of a ledger. Furthermore, in some approaches, at any time a determination may be made as to whether the current threat has caused a disaster event on the production site, e.g., see decision 308. In some approaches, in response to a determination that the current threat has not caused a disaster event on the production site, e.g., as illustrated by the "No" logical path of decision 308, a determination may be made as to whether the current threat is still a threat to the production environment and/or whether an update to the blockchain has caused another potential recovery site to be a relatively better, e.g., relatively more applicable, disaster recovery site to failover to than a most previously determined potential recovery site. Accordingly, the determined one of the potential recovery sites to use as the failover for the production site may be re-evaluated at any point in time and for any reason. In some approaches, the copy of the ledger may be re-analyzed in response to a determination that the information of the copy of the ledger has been updated, e.g., based on the blockchain being updated. For example, subsequent to determining one of the potential recovery sites to use as the failover for the production site, but prior to any determination that the current threat has caused a disaster event on the production site, a determination may be made that the blockchain has been updated, e.g., to reflect updates to the parameters of at least some of the sites. In one or more of such approaches, in response to a determination that the blockchain has been updated, the copy of the ledger, e.g., an updated copy of the ledger, may be analyzed to determine whether the previously determined recovery site is still the preferred site for purposes of the failover. Furthermore, as will be described in greater detail elsewhere below, e.g., see operation 316, subsequent to a failure event occurring, method 300 may optionally, additionally and/or alternatively include re-analyzing which potential production site to failover to in some approaches.

With continued reference to decision 308, in response to a determination that the current threat has caused a disaster event on the production site, e.g., as illustrated by the "Yes" logical path of decision 308, at least some operations may be performed to recover from the disaster event. For example, the production site may be caused to at least temporarily failover to the determined recovery site in some approaches, e.g., see operation 310. In some approaches, causing the production site to failover to the determined recovery site may include issuing an instruction to the production site and/or the determined recovery site. In some approaches, the failover includes the determined recovery site running an application that was running on the production site before the current threat caused the disaster event on the production site. Accordingly, causing the production site to failover to the determined recovery site may include issuing an instruction to the determined recovery site to at least temporarily run the application, e.g., where the application on the production site and the application on the determined recovery site are the same type of application.

It should be noted that although various approaches above are described from a perspective of the failover occurring for a single application of the production site to a determined recovery site, in some other approaches method 300 may additionally and/or alternatively include determining, for each of a plurality of applications running on the production site before the disaster event, a recovery site to failover the application to. Such determinations may consider that different applications may experience relatively more performance benefits as a result of being run on a recovery site with relatively more applicable features to the given application, e.g., see relative strengths and differentiators in FIGS. 6-7.

In some approaches, the production site is caused to at least temporarily failover to the determined recovery site for a predetermined amount of time and/or until a predetermined event is determined to occur. For example, in some approaches, the production site is caused to failover to the determined recovery site for a predetermined amount of time, e.g., ten minutes, one hour, one day, one month, etc. In some other approaches, the production site is caused to failover to the determined recovery site until a determination is made that the production site has recovered from the failure event. Accordingly, monitoring may be performed to determine whether the production site has recovered from the failure event.

Method 300 may optionally include determining whether the blockchain is updated while failover is occurring from the production site to the determined recovery site. For example, a determination may be made as to whether the information of the copy of the ledger has been updated, e.g., see decision 312. Such a determination may be based on a comparison of a most recent version of the copy of the ledger with a previous version of the copy of the ledger. In some other approaches, such a determination may be based on whether updated information has been reported to the blockchain by one or more of the potential recovery sites.

In response to a determination that the information of the copy of the ledger has not been updated, e.g., as illustrated by the "No" logical path of decision 312, the production site may be caused, e.g., instructed, to continue to failover to the determined recovery site, e.g., see operation 314. In contrast, in response to a determination that the information of the copy of the ledger has been updated, e.g., based on the blockchain being updated, method 300 optionally includes re-analyzing the copy of the ledger to determine whether to continue using the determined recovery site as the failover for the production site, e.g., see operation 316. In some approaches, techniques described elsewhere herein for analyzing the copy of the ledger to determine one of the potential recovery sites to use as a failover for the production site, e.g., see operation 306, may be used for the re-analyzing. In some other approaches, re-analyzing the copy of the ledger may include analyzing the updated copy of the ledger. This may include comparing at least some updated parameter scores of at least some of the potential recovery sites. The production site may be caused to failover to the determined recovery site, which may be a different recovery site than the recovery site determined in operation 306 of method 300. In one illustrative approach, based on the comparison of the at least some updated parameter scores of at least some of the potential recovery sites, it may be determined that, as a result of the update to the information of the copy of the ledger, a first of the potential recovery sites has relatively greater parameter scores than the parameter scores of the determined recovery site, e.g., the recovery site previously determined to be and/or currently serving as the failover site for the production site. In response to such a determination, method 300 optionally includes causing the production site, or an application thereof, to at least temporarily failover to the first recovery site, or an application thereof, e.g., see operation 318. In contrast, it may be determined that, as a result of the update to the information of the copy of the ledger, the determined recovery site has relatively greater parameter scores than the parameter scores of the other potential recovery sites. In other words, a determination is made that the previously determined recovery site is still the relatively most applicable recovery site while the production site recovers from the failure event. Accordingly, an application of the production site may be caused to at least temporarily continue failover to an application of the first recovery site until recovery of the production site is achieved.

In some approaches, various operations of method 300 may be performed by a trained artificial intelligence (AI) engine. Accordingly, method 300 optionally includes training an AI engine to perform operations described herein, e.g., the identifying and analyzing, and causing, e.g., instructing, the trained AI engine to perform the operations described herein, e.g., the identifying and analyzing. Training the AI engine may, in some approaches, involve using a training set of data to tune a relative accuracy of the AI engine to perform such operations of method 300. For example, techniques that would become appreciated by one of ordinary skill in the art upon reading the descriptions herein may be used to extract at least some parameter information from a copy of a blockchain ledger and compare such information to determine an associated failover recovery site for a production site in view of a current threat to the production site. During this training phase, feedback, such as rewards, may be generated based on a performance of the AI engine. This feedback may be reported to the AI engine subsequent to each iteration of analyzing the training data and guessing a failover recovery site associated with the training data. In some approaches, the AI engine may furthermore be trained to identify threats to the production site by processing one or more reports using known processing techniques, e.g., such as natural language processing (NLP). In response to a determination that the AI engine is trained, the trained AI engine may be assigned at least one production site to determine a relatively best failover recovery site in view of identified current threats to the production site.

Numerous benefits are enabled as a result of implementing techniques of various embodiments and approaches described herein. For example, these techniques proactively determine a relatively best, e.g., most applicable, disaster recovery site to failover a production site to at a given point in time. In some cases, this determination is made before a current threat to a production site even causes a failure event on the production site. This mitigates relatively extensive amounts of manual administrator troubleshooting that is conventionally performed after a failure event occurs, because a failover site is optionally determined before and/or at a time that a failure event occurs. It should be noted that as a result, downtime of applications run on sites that experience failure events is ultimately reduced. Furthermore, it should also be noted that analysis of such an extent of data that may be recorded in blockchain is not feasibly capable of being performed by a human. This is because current threats to a production site and/or information associated with potential recovery sites are fluid metrics that are in some approaches expected to rapidly and frequently change. It should be noted that use of analysis of blockchain data to determine a recovery site to failover a production site to has heretofore not been considered in conventional techniques of managing multi-site environments. Accordingly, the inventive discoveries disclosed herein proceed contrary to conventional wisdom.

Figure 4:
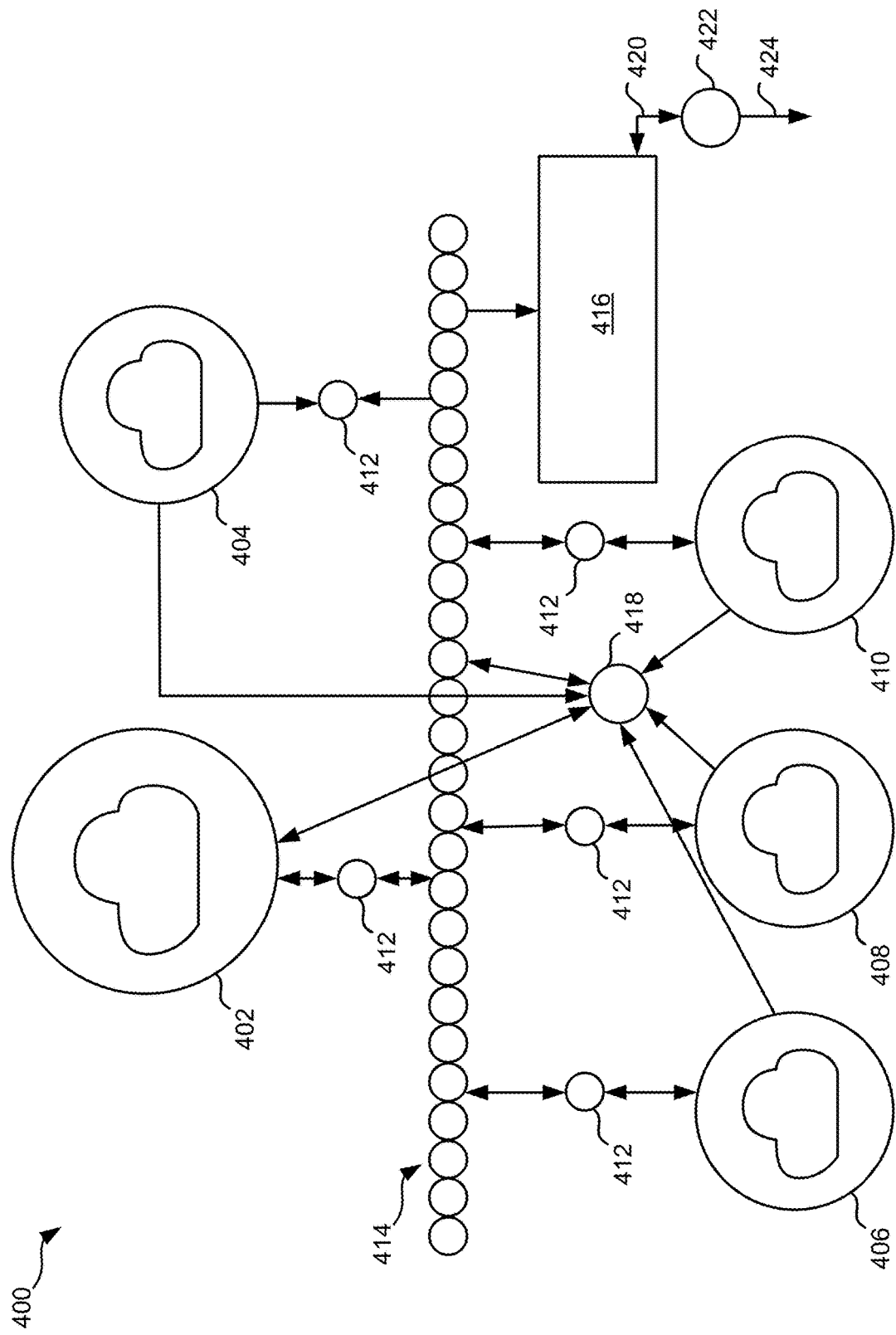
FIG. 4 depicts a multi-site environment architecture, in accordance with one embodiment of the present invention.

FIG. 4 depicts a multi-site environment architecture 400, in accordance with one embodiment. As an option, the present multi-site environment architecture 400 may be implemented in conjunction with features from any other embodiment listed herein, such as those described with reference to the other FIGS. Of course, however, such multi-site environment architecture 400 and others presented herein may be used in various applications and/or in permutations which may or may not be specifically described in the illustrative embodiments listed herein. Further, the multi-site environment architecture 400 presented herein may be used in any desired environment.

The multi-site environment architecture 400 includes a plurality of different cloud-based sites that are located in a plurality of different locations. For example, site 402 is a production site that is located in a first city, site 404 is a miner potential disaster recovery site that is located in a second city, site 406 is a miner potential disaster recovery site that is located in a third city, site 408 is a miner potential disaster recovery site that is located in a fourth city, and site 410 is a miner potential disaster recovery site that is located in a fifth city.

The multi-site environment architecture 400 furthermore includes a blockchain 414. Each of the sites 401-410 are preferably configured to store information, e.g., see parameter information 412 which may include shared periodic updates about a respective one of the sites, to the blockchain 414. A copy of a ledger that includes information associated with the plurality of potential recovery sites 404, 406, 408 and 410 may be accessed by a trained AI engine 416, and a current threat to the production site 402 may be identified.

A latest copy of the ledger may be analyzed, based on the current threat, to determine one of the potential recovery sites to use as a failover for the production site. For example, in operation 420, an automated recovery system 422 of the AI engine 416 may be used to perform such an analysis. More specifically, in some approaches, the analysis is performed in order to determine which of the recovery sites is a best suitable failover site per application (of a plurality of applications) being run on the production site. Accordingly, each of the recovery sites 404, 406, 408 and 410 are contesting to be approved as an application recovery resource for the production site 402.

The determined recovery site may be stored on a database as a consensus. In another approach, the determined recovery site may be stored on the blockchain to allow a ledger of the blockchain to indicate which recovery site is to act in the event that the current thread causes a disaster event. In response to a determination that the current threat has caused a disaster event on the production site 402, an application of the production site 402 may be caused to at least temporarily failover to an application of the determined recovery site, e.g., see operation 424 initiate the recovery of the application of the production site 402.

The multi-site environment architecture 400 furthermore may include a database 418 that includes historical data captured from the ledgers, which may be used by the AI engine 416 for analysis and decision making performed by the AI engine 416. This historical information may be incorporated from the copy of the ledger and used in one or more of the analysis operations for determining a failover site to use for a production site that is currently subjected to a threat as described elsewhere herein, e.g., see method 300.

FIG. 5 depicts a table 500, in accordance with one embodiment. As an option, the present table 500 may be implemented in conjunction with features from any other embodiment listed herein, such as those described with reference to the other FIGS. Of course, however, such table 500 and others presented herein may be used in various applications and/or in permutations which may or may not be specifically described in the illustrative embodiments listed herein. Further, the table 500 presented herein may be used in any desired environment.

The table 500 includes information of a copy of the ledger that is ongoingly stored on a blockchain by potential recovery sites, e.g., see sites @$5^{th}$ city, @$2^{nd}$ city, @$3^{rd}$ city, and @$4^{th}$ city, for a production site, e.g., see @$1^{st}$ city. More specifically, table 500 includes a plurality of different types of information, e.g., see "Set of Attributes/Parameters." The information contained in table 500 may be analyzed, based on an identified current threat to the production site, to determine one of the potential recovery sites to use as a failover for the production site. For context, the determined potential recovery site may act as a failover for the production site and may run an application, e.g., see AKRA, of the production site in response to a determination that the production site experienced a failure event that is based on the current threat. More specifically, in some approaches, when a disaster event strikes, all recovery sites protecting the application "AKRA" may contest to take over the application as a production site. Whichever recovery site is determined to have the relatively best scores and priorities, may be provided a predetermined key to start the application "AKRA" as a production site. Furthermore, all of this may be performed in the framework of the blockchain.

In some approaches, each of the types of information may be scored, e.g., see score, to distinguish relative strength and relative weaknesses among the various potential recovery sites. Each of the types of information may additionally and/or alternatively be assigned a priority score, e.g., see priority 1-10. These priority scores add weight to the types of information in order to allow some types of information to be considered relatively more important than some other types of information in the determination of a potential site to failover an application of the production site to in the event that the production site experiences a failure event.

Figure 6:
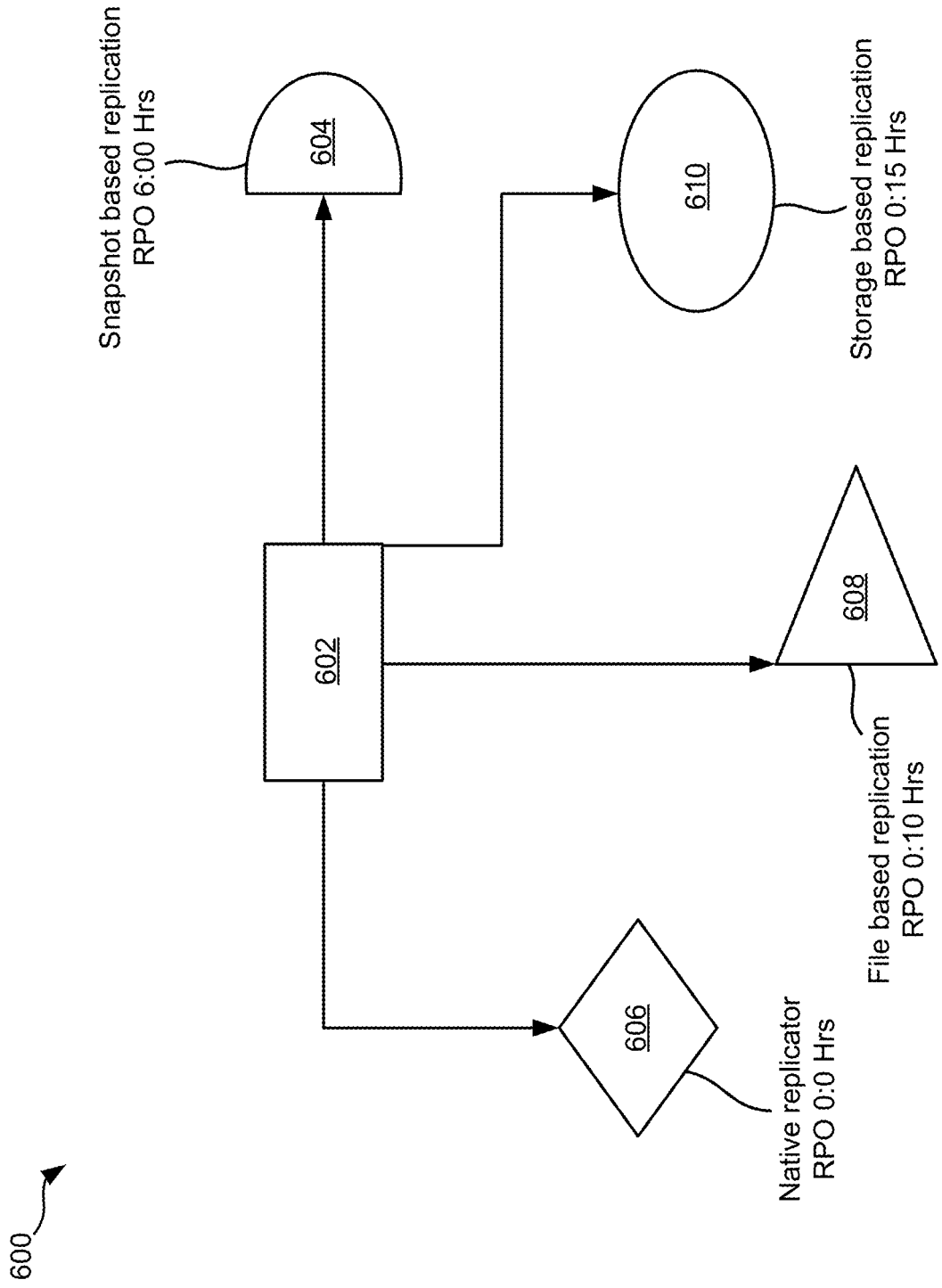
FIG. 6 depicts a multi-site environment architecture, in accordance with one embodiment of the present invention.

FIG. 6 depicts a multi-site environment architecture 600, in accordance with one embodiment. As an option, the present multi-site environment architecture 600 may be implemented in conjunction with features from any other embodiments listed herein, such as those described with reference to the other FIGS. Of course, however, such multi-site environment architecture 600 and others presented herein may be used in various applications and/or in permutations which may or may not be specifically described in the illustrative embodiments listed herein. Further, the multi-site environment architecture 600 presented herein may be used in any desired environment.

The multi-site environment architecture 600 includes a production site 602 that is located in a first city. Furthermore, the multi-site environment architecture 600 includes a plurality of potential recovery sites, e.g., see potential recovery site 604 that is located in a second city, potential recovery site 606 that is located in a third city, potential recovery site 608 that is located in a fourth city, and potential recovery site 610 that is located in a fifth city. It may also be assumed that each of the sites are running the same application, e.g., AKRA.

In order to protect, e.g., preserve from disaster events, the applications running on each of the potential recovery sites, relative strengths may be identified on each of the different sites. These relative strengths may be identified in view of a current threat to the production site 602. For example, in some approaches, a copy of a ledger may be analyzed, based on the current threat, to determine one of the potential recovery sites to use as a failover for the production site. From this analysis, it may be determined that a relative strength of the potential recovery site 604 is snapshot based replication, e.g., in view of a predetermined recovery point objective (RPO) of six hours. In another example, it may be determined that a relative strength of the potential recovery site 606 is native replication, e.g., in view of a predetermined recovery point objective of zero hours. In yet another example, it may be determined that a relative strength of the potential recovery site 608 is file based replication, e.g., in view of a predetermined RPO of one-tenth of an hour. In another example, it may be determined that a relative strength of the potential recovery site 610 is storage based replication, e.g., in view of a predetermined RPO of one-fifteenth of an hour.

Figure 7:
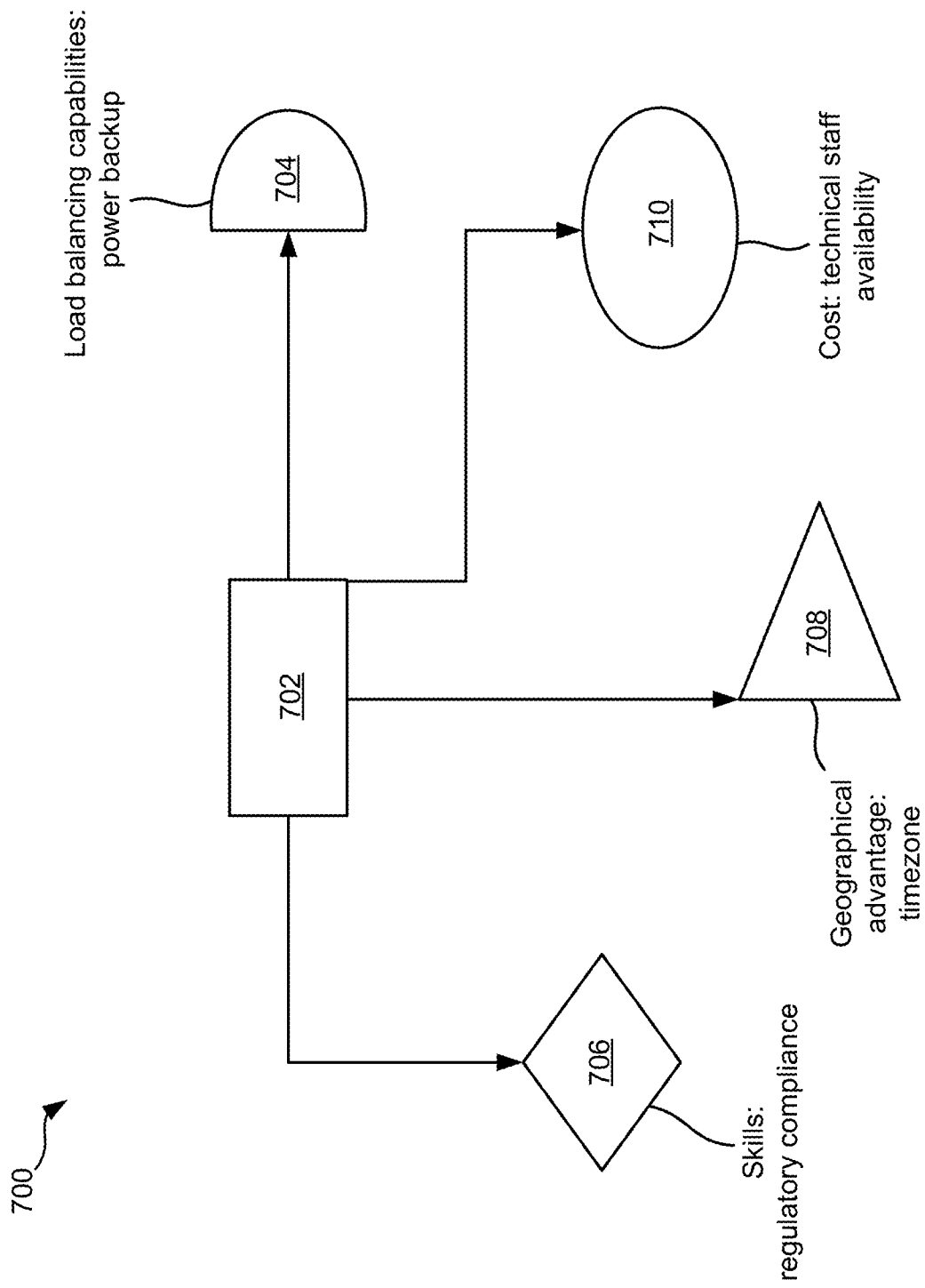
FIG. 7 depicts a multi-site environment architecture, in accordance with one embodiment of the present invention.

FIG. 7 depicts a multi-site environment architecture 700, in accordance with one embodiment. As an option, the present multi-site environment architecture 700 may be implemented in conjunction with features from any other embodiment listed herein, such as those described with reference to the other FIGS. Of course, however, such multi-site environment architecture 700 and others presented herein may be used in various applications and/or in permutations which may or may not be specifically described in the illustrative embodiments listed herein. Further, the multi-site environment architecture 700 presented herein may be used in any desired environment.

The multi-site environment architecture 700 includes a production site 702 that is located in a first city. Furthermore, the multi-site environment architecture 700 includes a plurality of potential recovery sites, e.g., see potential recovery site 704 that is located in a second city, potential recovery site 706 that is located in a third city, potential recovery site 708 that is located in a fourth city, and potential recovery site 710 that is located in a fifth city. It may also be assumed that each of the sites are running the same application, e.g., AKRA.

In order to protect, e.g., preserve from disaster events, the applications running on each of the potential recovery sites, relative differentiators may be identified on each of the different sites. These relative differentiators may be identified in view of a current threat to the production site 702. For example, in some approaches, a copy of a ledger may be analyzed, based on the current threat, to determine one of the potential recovery sites to use as a failover for the production site. From this analysis, it may be determined that a relative differentiator of the potential recovery site 704 is a load balancing capability, e.g., power backups. In another example, it may be determined that a relative differentiator of the potential recovery site 706 is a skill, e.g., regulatory compliance. In yet another example, it may be determined that a relative differentiator of the potential recovery site 708 is geographical advantage, e.g., time zone. In another example, it may be determined that a relative differentiator of the potential recovery site 710 is cost, e.g., technical staff availability.

Figure 8:
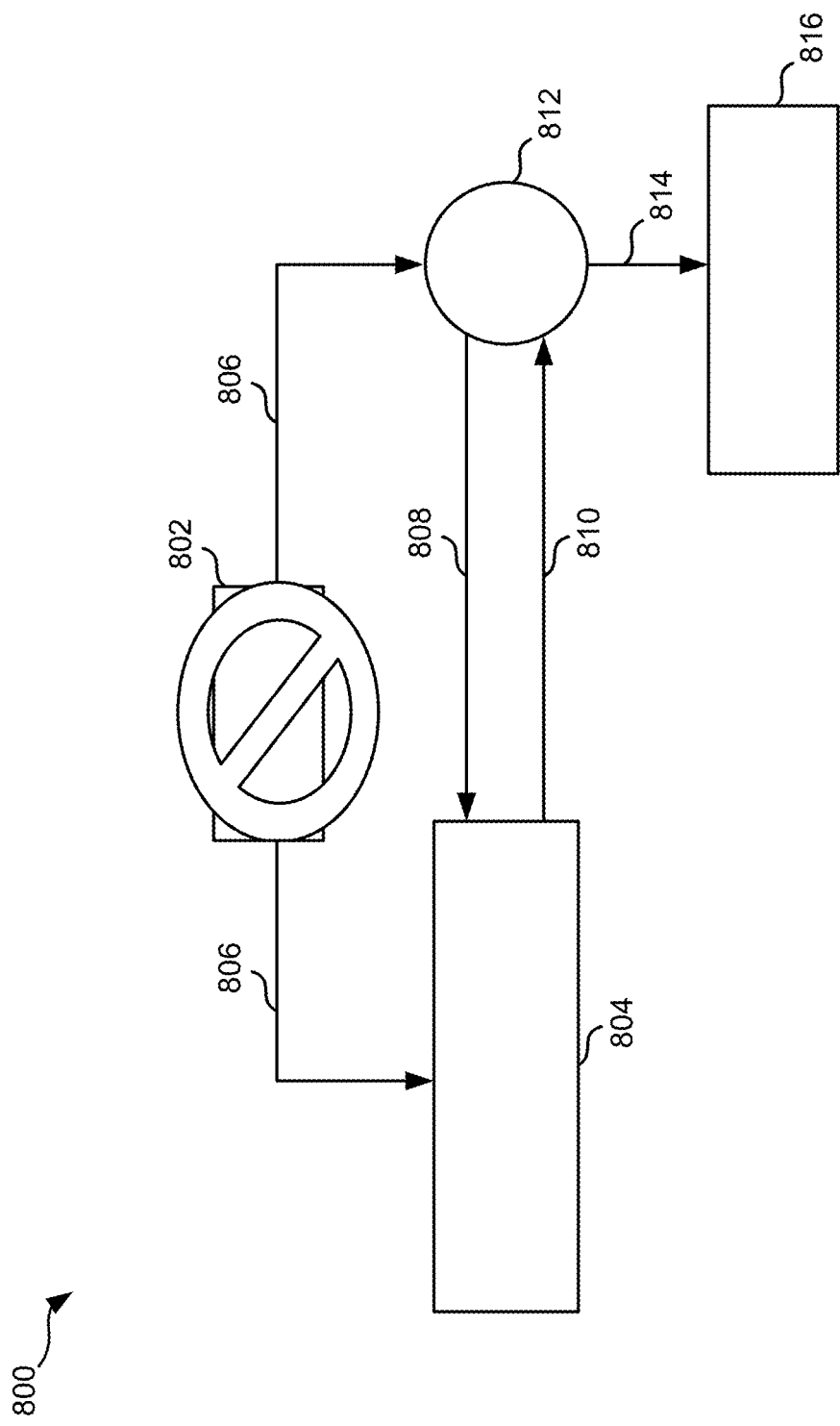
FIG. 8 depicts a multi-site environment architecture, in accordance with one embodiment of the present invention.

FIG. 8 depicts a multi-site environment architecture 800, in accordance with one embodiment. As an option, the present multi-site environment architecture 800 may be implemented in conjunction with features from any other embodiment listed herein, such as those described with reference to the other FIGS. Of course, however, such multi-site environment architecture 800 and others presented herein may be used in various applications and/or in permutations which may or may not be specifically described in the illustrative embodiments listed herein. Further, the multi-site environment architecture 800 presented herein may be used in any desired environment.

The multi-site environment architecture 800 includes a production site 802 that has experienced a failure event. A decision that identified which potential recovery site to failover to may be made by a system 804 that identified a rightful disaster recovery site for an application, e.g., AKRA, of the production site 802. The system 804 may be assisted by a trained AI engine that is configured to make the decision in response to receiving a notification 806 that the production site has failed. A first layer of the multi-site environment architecture 800 includes a latest copy of a blockchain ledger. The AI engine may ongoingly update the ledger using information periodically provided by potential recovery sites, e.g., miner nodes that are configured to update the records on the ledgers after validation. A second layer of the multi-site environment architecture 800 includes business logic that considers the historical data, e.g., in a copy of the ledger, and a current scenario, e.g., what kind of disaster is imminent and/or has occurred, where does each site stand currently, etc., and makes decisions of where to failover to, based on this data. In a third layer of the multi-site environment architecture 800, includes a recommendation of a recovery site to failover to. For example, a query 808 may be received by the third layer from an automated recovery system 812 that inquires where the application of the production site should failover to. An answer 810 to the question may be determined and provided to the third layer. Moreover, in some approaches, the automated recovery system 812 is in communication 814 with an automated process 816 of moving the application of the production site 802 to the determined failover site.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
issuing instructions to a plurality of potential recovery sites of a multi-site environment, wherein the instructions instruct the potential recovery sites to store information associated with the potential recovery sites, on a blockchain;
accessing a copy of a ledger of the blockchain;
identifying a current threat to a production site of the multi-site environment;
analyzing, based on the current threat, the copy of the ledger to determine one of the potential recovery sites to use as a failover for the production site; and
in response to a determination that the current threat has caused a disaster event on the production site, causing the production site to failover to the determined recovery site, the determined recovery site being stored to the copy of the ledger.

2. The computer-implemented method of claim 1, wherein the analyzing, based on the current threat, the copy of the ledger to determine one of the potential recovery sites to use as the failover for the production site includes: comparing one or more parameter scores of the potential recovery sites with one or more parameter scores of the other potential recovery sites, identifying a first of the potential recovery sites having relatively greater parameter scores than the parameter scores of the other potential recovery sites, wherein the determined recovery site is the first potential recovery site.

3. The computer-implemented method of claim 1, wherein the analyzing, based on the current threat, the copy of the ledger to determine one of the potential recovery sites to use as the failover for the production site includes: comparing one or more parameters of the potential recovery sites with one or more current parameters of the production site, wherein the determined recovery site is the potential recovery site having one or more parameters with a greatest degree of similarity with the one or more current parameters of the production site.

4. The computer-implemented method of claim 1, wherein the analyzing, based on the current threat, the copy of the ledger to determine one of the potential recovery sites to use as the failover for the production site includes: determining a first of the potential recovery sites having parameters that are relatively more resistant to the identified current threat than the other potential recovery sites, wherein the determined recovery site is the first potential recovery site.

5. The computer-implemented method of claim 1, wherein the information includes parameters of the potential recovery sites, wherein the parameters are dynamically selected from the group consisting of: recovery time, time zones, infrastructure strength, a time since last experiencing an outage, and cost.

6. The computer-implemented method of claim 1, wherein the current threat is selected from the group consisting of: a natural disaster event, a human-made disaster event, and a cyber-attack, wherein the instructions instruct the potential recovery sites to store the information based on an occurrence of a predetermined event on the potential recovery site, wherein the predetermined event includes a disaster event.

7. The computer-implemented method of claim 1, comprising:
in response to a determination that the information has been updated, re-analyzing the copy of the ledger to determine whether to continue using the determined recovery site as the failover for the production site.

8. The computer-implemented method of claim 7, wherein re-analyzing the copy of the ledger includes comparing parameter scores of the potential recovery sites, and comprising:
in response to a determination that, as a result of the update to the information, a first of the potential recovery sites has relatively greater parameter scores than the parameter scores of the determined recovery site, causing the production site to failover to the first recovery site.

9. The computer-implemented method of claim 1, comprising:
training an artificial intelligence (AI) engine to perform the identifying and analyzing, wherein the training includes using a training set of data to tune a relative accuracy of the AI engine; and
causing the trained AI engine to perform the identifying and analyzing.

10. A computer program product, the computer program product comprising a computer readable storage medium having program instructions embodied therewith, the program instructions executable by a computer to cause the computer to:
issue, by the computer, instructions to a plurality of potential recovery sites of a multi-site environment, wherein the instructions instruct the potential recovery sites to store information associated with the potential recovery sites, on a blockchain;
access, by the computer, a copy of a ledger of the blockchain;
identify, by the computer, a current threat to a production site of the multi-site environment;
analyze, by the computer, based on the current threat, the copy of the ledger to determine one of the potential recovery sites to use as a failover for the production site; and
in response to a determination that the current threat has caused a disaster event on the production site, cause, by the computer, the production site to failover to the determined recovery site, the determined recovery site being stored to the copy of the ledger.

11. The computer program product of claim 10, wherein the analyzing, based on the current threat, the copy of the ledger to determine one of the potential recovery sites to use as the failover for the production site includes: comparing one or more parameter scores of the potential recovery sites with one or more parameter scores of the other potential recovery sites, identifying a first of the potential recovery sites having relatively greater parameter scores than the parameter scores of the other potential recovery sites, wherein the determined recovery site is the first potential recovery site.

12. The computer program product of claim 10, wherein the analyzing, based on the current threat, the copy of the ledger to determine one of the potential recovery sites to use as the failover for the production site includes: comparing one or more parameters of the potential recovery sites with one or more current parameters of the production site, wherein the determined recovery site is the potential recovery site having one or more parameters with a greatest degree of similarity with the one or more current parameters of the production site.

13. The computer program product of claim 10, wherein the analyzing, based on the current threat, the copy of the ledger to determine one of the potential recovery sites to use as the failover for the production site includes: determining a first of the potential recovery sites having parameters that are relatively more resistant to the identified current threat than the other potential recovery sites, wherein the determined recovery site is the first potential recovery site.

14. The computer program product of claim 10, wherein the information includes parameters of the potential recovery sites, wherein the parameters are dynamically selected from the group consisting of: recovery time, time zones, infrastructure strength, a time since last experiencing an outage, and cost.

15. The computer program product of claim 10, wherein the current threat is selected from the group consisting of: a natural disaster event, a human-made disaster event, and a cyber-attack, wherein the instructions instruct the potential recovery sites to store the information based on an occurrence of a predetermined event on the potential recovery site, wherein the predetermined event includes a disaster event.

16. The computer program product of claim 10, the program instructions executable by the computer to cause the computer to:
in response to a determination that the information has been updated, re-analyze, by the computer, the copy of the ledger to determine whether to continue using the determined recovery site as the failover for the production site.

17. The computer program product of claim 16, wherein re-analyzing the copy of the ledger includes comparing parameter scores of the potential recovery sites, and comprising: in response to a determination that, as a result of the update to the information, a first of the potential recovery sites has relatively greater parameter scores than the parameter scores of the determined recovery site, causing the production site to failover to the first recovery site.

18. The computer program product of claim 10, the program instructions executable by the computer to cause the computer to:
train, by the computer, an artificial intelligence (AI) engine to perform the identifying and analyzing, wherein the training includes using a training set of data to tune a relative accuracy of the AI engine; and
cause, by the computer, the trained AI engine to perform the identifying and analyzing.

19. A system, comprising:
a hardware processor; and
logic integrated with the processor, executable by the processor, or integrated with and executable by the processor, the logic being configured to:
access a copy of a ledger that includes information associated with a plurality of potential recovery sites of a multi-site environment, wherein the information of the copy of the ledger includes dynamically selected parameters of the potential recovery sites;
identify a current threat to a production site of the multi-site environment;
analyze based on the current threat, the copy of the ledger to determine one of the potential recovery sites to use as a failover for the production site; and
in response to a determination that the current threat has caused a disaster event on the production site, cause the production site to failover to the determined recovery site, the determined recovery site being stored to the copy of the ledger.

20. The system of claim 19, wherein the analyzing, based on the current threat, the copy of the ledger to determine one of the potential recovery sites to use as the failover for the production site includes: comparing one or more parameter scores of the potential recovery sites with one or more parameter scores of the other potential recovery sites, identifying a first of the potential recovery sites having relatively greater parameter scores than the parameter scores of the other potential recovery sites, wherein the determined recovery site is the first potential recovery site, wherein the information of the copy of the ledger is stored on a blockchain by the potential recovery sites.

* * * * *